United States Patent [19]

Beni et al.

[11] Patent Number: 4,541,771

[45] Date of Patent: Sep. 17, 1985

[54] ROBOT HAVING MAGNETIC PROXIMITY SENSOR AND MANUFACTURING METHOD USING SAME

[75] Inventors: Gerardo Beni, Old Bridge; Susan Hackwood, Freehold; Lawrence A. Hornak, Ocean, all of N.J.

[73] Assignee: AT&T Bell Laboratories, Murray Hill, N.J.

[21] Appl. No.: 480,826

[22] Filed: Mar. 31, 1983

[51] Int. Cl.⁴ .............................................. B25J 17/02
[52] U.S. Cl. ................................... 414/730; 294/65.5; 294/86.4; 324/226; 901/35; 414/786; 414/5
[58] Field of Search ............................ 901/35, 46, 50; 414/729, 730, 786, 5; 324/207, 208, 226; 180/168; 294/86 R, 65.5; 318/647

[56] References Cited

U.S. PATENT DOCUMENTS

| 3,042,857 | 7/1962 | Ronka | 324/226 X |
| 3,820,090 | 6/1974 | Wiegand | 340/174 |
| 4,260,187 | 4/1981 | Frosch et al. | 414/730 X |

FOREIGN PATENT DOCUMENTS 925624  5/1982  U.S.S.R. ......................... 901/35 X

OTHER PUBLICATIONS

J. M. Vranish, E. Mitchell and R. DeMoyer, "'Outstanding Potential' Shown by Magnetoelastic Force Feedback Sensors for Robots", *Sensor Review*, p. 200, Oct. 1982.

"Wiegand Effect Design Guide", *Sensor Engineering Co. Technical Bulletin*, No. 101, pp. 1-6, Jan. 1979.

G. H. Kuers, "The Wiegand Effect in Theory and Practice", *2nd International Conference on Robot Vision and Sensory Controls*, Stuttgart, Germany, Nov. 2-4, 1982, pp. 123-132.

K. Mohr, S. Takeuchi and T. Fujimoto, "Sensitive Magnetic Sensors Using Amorphous Wiegand-Type Ribbons", *IEEE Transactions on Magnetics*, vol. MAG-17, No. 6, pp. 3370-3372, Nov. 1981.

B. Dance, "Wiegand Effect in Vehicles", *Practical Electronics*, pp. 39-40, Jan. 1980.

*Primary Examiner*—Robert J. Spar
*Assistant Examiner*—Donald W. Underwood
*Attorney, Agent, or Firm*—Michael J. Urbano

[57] ABSTRACT

Described is a robot having a proximity sensor which is based on the reentrant-loop magnetic effect. In one embodiment this sensor in a robot hand can detect the position and orientation of magnetized objects within about a 5 cm range, independently of the speed of approach.

11 Claims, 11 Drawing Figures

S1

S2

ROBOT HAVING MAGNETIC PROXIMITY SENSOR AND MANUFACTURING METHOD USING SAME

BACKGROUND OF THE INVENTION

This invention relates to the field of robotics and, more particularly, to proximity sensors for robot hands, arms or other moving parts. It also relates to manufacturing methods which utilize such robots to handle magnetized objects.

The need for efficient proximity sensors for robotics has been recognized for some time. Obstacle avoidance, safety and high speed of approach are among the reasons for the usefulness of such sensors. For robotic applications various kinds of physical effects, including acoustic, optical, capacitive and magnetic effects, have been proposed to achieve the sensing function. So far, the proposed devices for robotic proximity sensors have been straightforward extensions of control or dedicated-automation devices; thus, the programmable motion of the robot has not been taken into account.

Various types of magnetic phenomena (e.g., the Hall effect, variable reluctance, magnetoresistance, Eddy currents, magnetostriction, etc.) are applicable to robotic sensors for special purposes. However, in any magnetic sensor there are a priori disadvantages: first, the obvious limitation to detection of magnetized objects (i.e., objects of magnetic material or objects of nonmagnetic material but which include a magnetic marker); second, the interference caused by extraneous magnetic fields; third, the frequent presence of hysteretic effects; and, fourth, limited range of sensing. Nevertheless, magnetic sensors have found widespread use in specialized applications, for example, in the measurement of the speed of rotation of wheels and gears.

For robotic applications, the previously mentioned disadvantages can be balanced and outweighed by several inherent advantages. First, the magnetic field, being a vector quantity, contains information not only about distance but also about orientation. A trivial example of magnetic orientation-detection is the compass. Thus, magnetic sensors have inherent advantages for the critical problem of part orientation. A second critical problem in robotic manipulation is sensor fragility. A magnetic sensor, however, can be embedded in a robot hand and thus can be protected from mechanical damage. For the same reasons it can be combined without interference with other sensors, such as tactile sensors. Finally, magnetic materials are inexpensive, easy to fabricate and highly developed technologically.

SUMMARY OF THE INVENTION

In accordance with our invention, at least one magnetic sensor, which relies on the reentrant-loop effect, is incorporated into a moving part of a robot such as the robot hand or arm. When a magnetic object (or a nonmagnetic object with a magnetic marker) is near the moving part, the sensor generates sharp, uniform electrical pulses without the need for complex electronics.

The combination of two properties make these reentrant-loop sensors particularly advantageous for robotics: first, the sensor material can withstand considerable environmental hostility, and second, the electrical pulses are insensitive to the speed of approach of the object.

Another aspect of our invention is a manufacturing method which utilizes such a robot to handle magnetized objects.

BRIEF DESCRIPTION OF THE DRAWING

Our invention, together with its various features and advantages, can be readily understood from the following, more detailed description taken in conjunction with the accompanying drawing, in which.

DETAILED DESCRIPTION

Before discussing the various robotic embodiments of our invention, consider first the physics of the reentrant-loop magnetic effect. One type of discontinuous behavior of the magnetism in a specimen with an applied magnetic field is known as the Barkhausen effect, and a single large jump in the magnetization is usually referred to as a large "Barkhausen discontinuity", as described by H. Barkhausen, Phyzik Z., Vol. 20, pp. 401 (1919). These discontinuities may give rise to reentrant-loop hysteretic cycles. Such Barkhausen discontinuities observed in thin wires can be controlled to a large degree by the wire processing, geometry, and excitation field. For example, RMM wires of homogeneous alloys (such as 50% Ni, 50% Fe or 10% V, 52% Co and 38% Fe), when appropriately cycled under tension at given temperatures, acquire a new and useful property, as described in U.S. Pat. No. 3,820,090. The coercive force of the core becomes much smaller than the coercive force of the external part of the wire, so that the magnetic field necessary to switch the direction of magnetization of the core is much smaller than for the external part. Thus, an appropriate external magnetic field can induce a quick variation of the magnetic flux in the wire which generates a voltage pulse in a coil wound around the wire or placed in its proximity. Other RMM alloys include amorphous metallic materials of the type described by H. Chen et al in copending patent application Ser. No. 460,401 filed on Jan. 24, 1983, and assigned to the assignee hereof.

Figure 1:
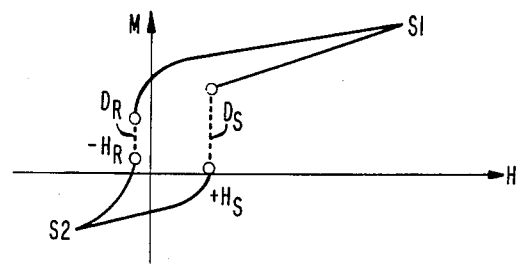
FIG. 1 shows the hysteresis cycle of Reentrant Magnetic Material (RMM) wires, where M is the magnetization and H is the magnetic field.
Figure 2:
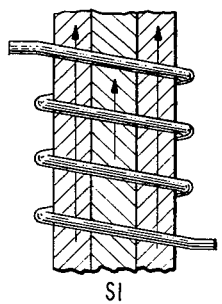
FIGS. 2 and 3 show the state of magnetization of the core and external part of a RMM wire.
Figure 3:
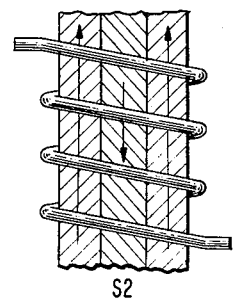
Figure 4:
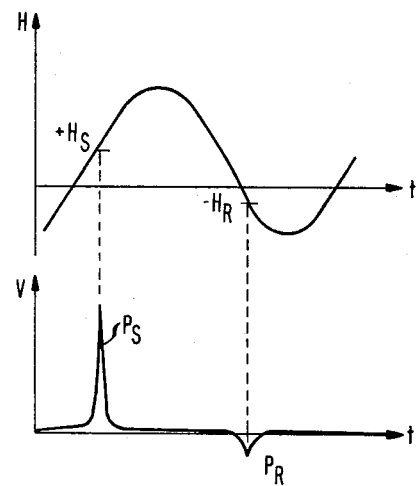
FIG. 4 shows the voltage pulses generated in a coil wrapped around a RMM wire.

In accordance with our invention, it is convenient to excite a RMM wire asymmetrically as shown schematically in FIGS. 1 and 4. FIG. 1 shows the hysteresis cycle of the wire, whereas FIGS. 2 and 3 show the state of magnetization of the core and external part of the wire during the hysteresis cycle. Illustratively, the excitation state S1 is obtained by applying a magnetic field $H_S$ of intensity $\sim$120 Oe. For this value of the field, both the core and the external part of the wire have the same direction of magnetization as shown in state S1 of FIG. 2. The reset position S2 is obtained by applying a magnetic field $H_R$ of $\sim$20 Oe in the direction opposite to $H_S$. In this case, the core and the external part have magnetizations directed in opposite directions as shown in state S2 of FIG. 3. FIG. 4 shows the voltage pulses in the coil wound around the wire under this type of excitation. The coil is connected to suitable electronic detection and processing equipment as discussed later. The large positive pulse $P_S$ occurs when the direction of magnetization of the core switches along the hysteresis cycle from S2 to S1. This pulse corresponds to the large discontinuity $D_S$ in the right-hand side of the cycle. A small negative pulse $P_R$ corresponds with the less relevant discontinuity $D_R$ on the left-hand side of the hysteresis cycle.

This phenomenon can be used to generate sharp, uniform electrical pulses without complex electronics. Indeed, a RMM wire can be an ideal pulse generator since it can produce large ($\sim$10 V) sharply defined ($\sim$20 $\mu$sec) pulses of the same amplitude, independently of the rate at which the external magnetic field is changed (i.e., independently of the speed of the object being sensed). The pulses have a large signal-to-noise ratio. Thus, it is easy to design electronic control circuits since the usual pulse-shaping networks and noise-suppressing electronics are not needed. In this regard, the reentrant-loop effect has already found practical applications in automotive parts and security systems.

Two of the reentrant-loop effects are useful in robotics. First, a reentrant-loop wire can withstand considerable environmental hostility, for example, vibrations and wet or dirty conditions. It can perform at temperatures ranging from $-70°$ C. to $+260°$ C. A second useful property is the nonrate-sensitive pulse production. This property has been utilized to design magnetic read-heads for keyboards. Read-head modules have also been produced for reading binary coded signals which are generated by a series of RMM wires embedded in a plastic card passing through the read-head. The speed of approach insensitivity is particularly advantageous in robotics since identical signals are generated even when approaching an object at different speeds.

The combination of these properties makes the reentrant-loop effect nearly ideal for designing a proximity sensor. The basic RMM sensing module, shown schematically in FIG. 5, comprises a RMM wire 10 with a coil 12 wrapped around it (or in close proximity) and a reset electromagnet 14 parallel to the wire. Illustratively, the wire 10 is 2 cm long, 75 $\mu$m in diameter, and is electrically insulated from the coil 12 by a dielectric material (not shown). The coil itself may have thousands of turns. For convenience of handling, these components may be mounted on a nonmagnetic substrate 11. The direction of magnetization of the reset magnet 14 is shown by arrow 18. The current supply for magnet 14 is depicted as a drive circuit 20 which may be under the control of signal processor 22 via lead 21. The latter detects and processes the electrical pulses generated in coil 12 and, of course, may take the form of a computer.

A permanent reset magnet 14 could be used for limited applications as is done in nonrobotic prior art devices. For robotics, however, a reset electromagnet is particularly advantageous. In fact, the magnetized object (e.g., magnet 24) to be sensed will be detected at a distance which can be pre-programmed by controlling the current in the electromagnet via the processor 22. Alternatively, the strength and direction of the electromagnet can be varied simultaneously during robot motion toward the target so as to determine distance and/or orientation, as discussed later. This device could also operate without reset magnet 18 if, for example, a magnetic field, generated in the coil 12 by a current flowing therein, is sufficiently large to cause the RMM to be reset. The current flow could be controlled by the signal processor 22.

Figure 5:
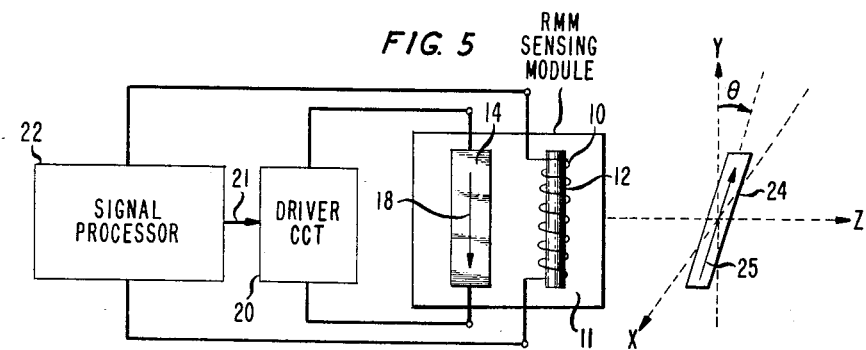
FIG. 5 demonstrates RMM effect proximity sensing using a sensing module composed of a RMM wire with a pick-up coil and a reset magnet.
Figure 7:
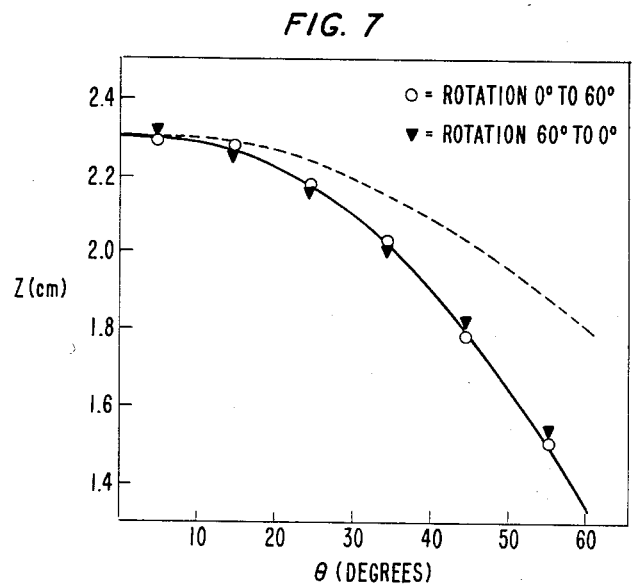
FIG. 7 is a graph of switching distance z (solid line) as a function of orientation angle $\theta$ for a RMM module (2 cm long, 3500 coil turns). The dashed line shows the behavior of a perfect dipole for the same module.

To test the spatial accuracy of detection for objects of unknown magnetization we performed the following experiment. In an arrangement as shown in FIG. 5 the set magnet 24 was moved toward the RMM module along the line passing through their centers (i.e., the z-axis). The angle $\theta$ in the x-y plane between the vertical y-axis and the set magnet 24 was varied, and the threshold distance for switching was measured. FIG. 7 shows the measured switching distance as a function of orientation angle $\theta$ for the magnet 24 moving perpendicularly to the center of a RMM module (i.e., 45° on either side of dipole 49) in which the RMM wire 10 was 2 cm long and the coil 12 had 3500 turns. The reset field was provided by a reset permanent magnet 14 which was positioned behind the wire 10 and parallel to it. The directions of magnetization 18 and 25 of the reset and set magnets were opposite to one another at $\theta = 0°$. The data were taken as the orientation angle $\theta$ for the reset magnet was increased from 0° to 60° and decreased from 60° to 0° to check for hysteresis effects. In addition, hysteresis effects were tested by moving the set magnet (approaching and receding from the module) across the switching threshold. No hysteresis was detected within the resolution of the experimental equipment, i.e., 25 $\mu$m. Overall, the data show clearly that hysteresis is negligible to within 100 micrometers. Reproducibility is also in the same limits. Experimenting with different strengths of reset magnets, we have achieved detection ranges of about 5 cm for realistically large magnetic fields.

Figure 6:
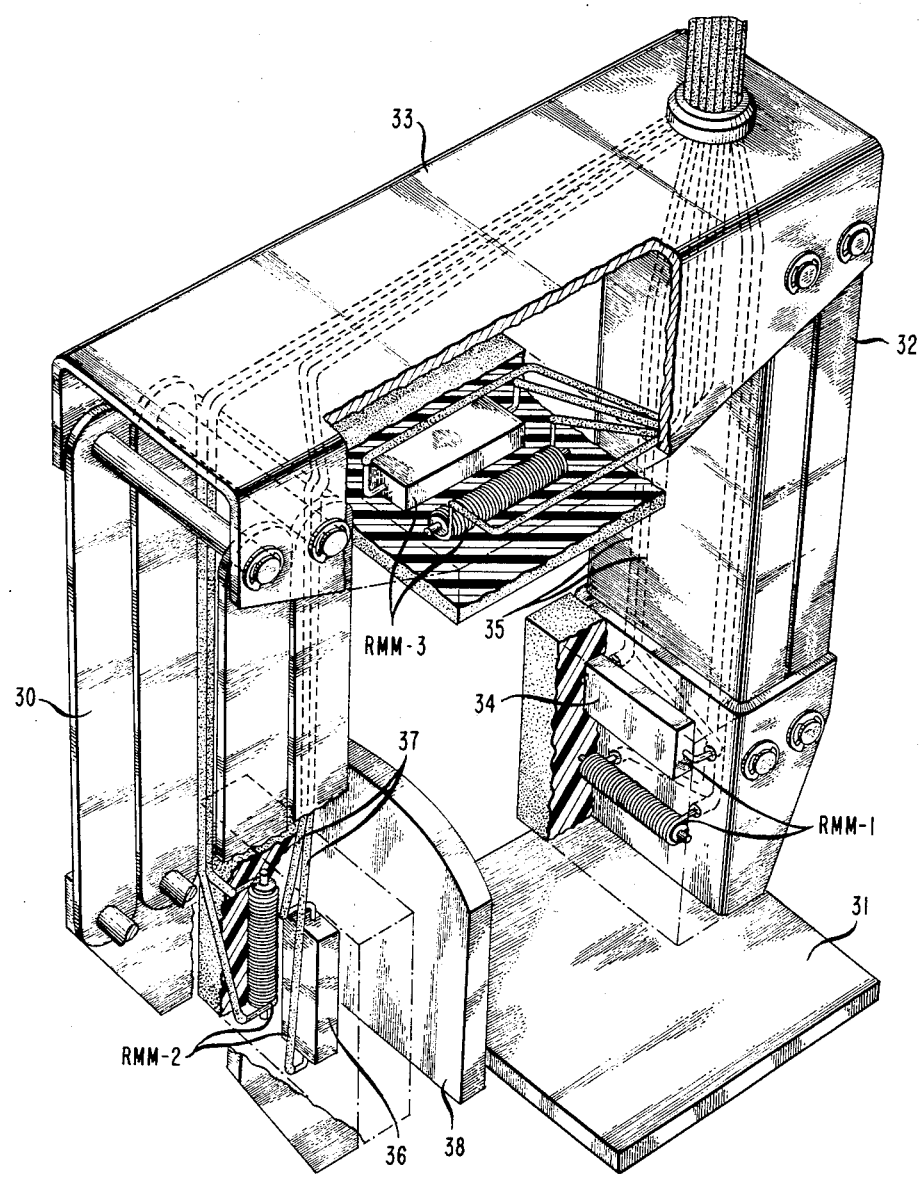
FIG. 6 shows three RMM modules in a robot hand in accordance with one embodiment of our invention.

The simplest application of our sensor module is the detection of magnetized objects by placing a RMM module in a robot fingertip or other part of the robot hand. One embodiment is shown in FIG. 6, which depicts a robot hand having left and right fingers 30 and 32, respectively, pivotally connected to a palm portion 33. A sensing module RMM-1 in the right fingertip has its magnetization direction oriented perpendicular to that of a sensing module RMM-2 in the left fingertip. RMM-1 detects magnetized objects 31 while the hand is approaching them. RMM-2 detects magnetized objects 38 in the region between the fingers 30 and 32. For both fingertips the range can be tailored by controlling the strength of the reset magnets 34 and 36; e.g., via leads 35 and 37 when magnets 34 and 36 are electromagnets. Clearly, sensing during the rotation of the hand would make it possible to sense the presence of magnetized objects regardless of their direction of magnetization. Additional sensing modules may be inserted in other parts of the hand (or the robot arm) for added sensitivity or redundancy. For example, sensing module RMM-3 in the palm portion 33 of the robot hand allows vertical detection and orientation of the magnetized objects between the fingers. RMM-3 preferably has its magnetization direction orthogonal to the magnetization directions of both RMM-1 and RMM-2.

Furthermore, this type of proximity sensing via RMM modules can be generalized to a more sophisticated magnetic read-head mounted on the robot hand. Such a read-head could be used with ferromagnetic objects or in conjunction with magnetic markers placed on nonmagnetic objects. Optical reading of binary labels has become commonplace in many aspects of distribution and manufacturing. For robots, there are two major advantages in magnetic reading vis-a-vis optical reading. First, the marker and/or the read-head can be embedded, so that the reading can take place across optically inaccessible barriers, such as an opaque protective layer or a coating of paint. Second, position, orientation and identification can be simultaneously read in a single marker.

Figure 10:
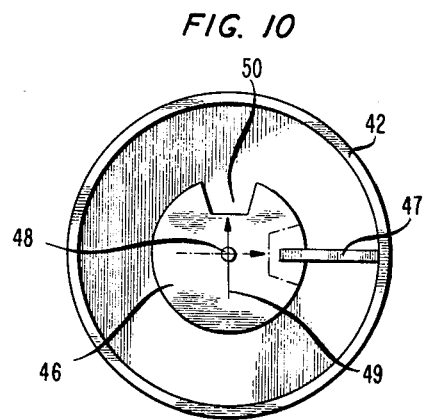
FIG. 10 is an end view of the quasi-cylindrical object shown in FIGS. 8 and 9.
Figure 8:
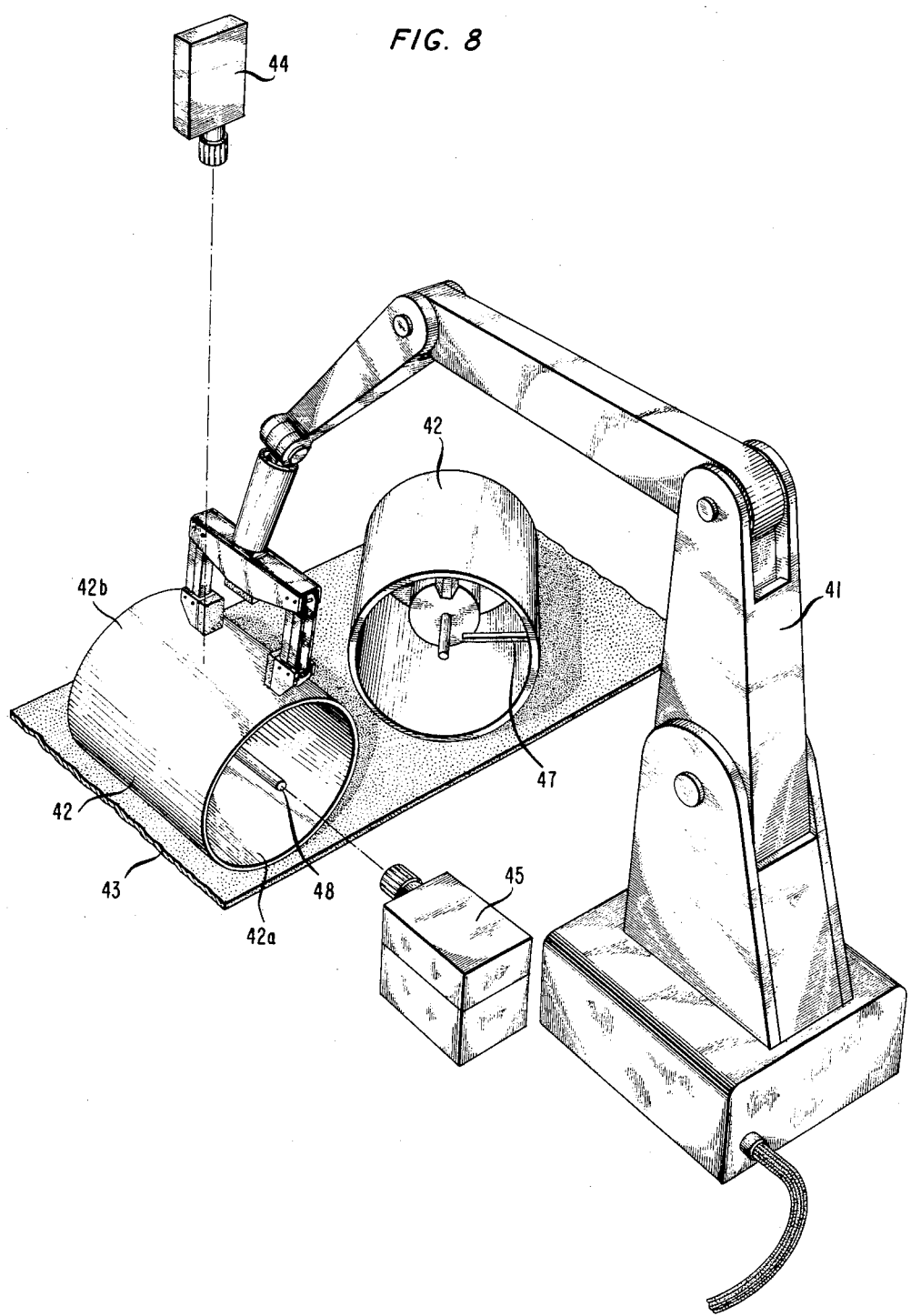
FIGS. 8 and 9 show schematically how a robot equipped with RMM module sensing removes a quasi-cylindrical object from the inside of a hollow cylinder.
Figure 9:
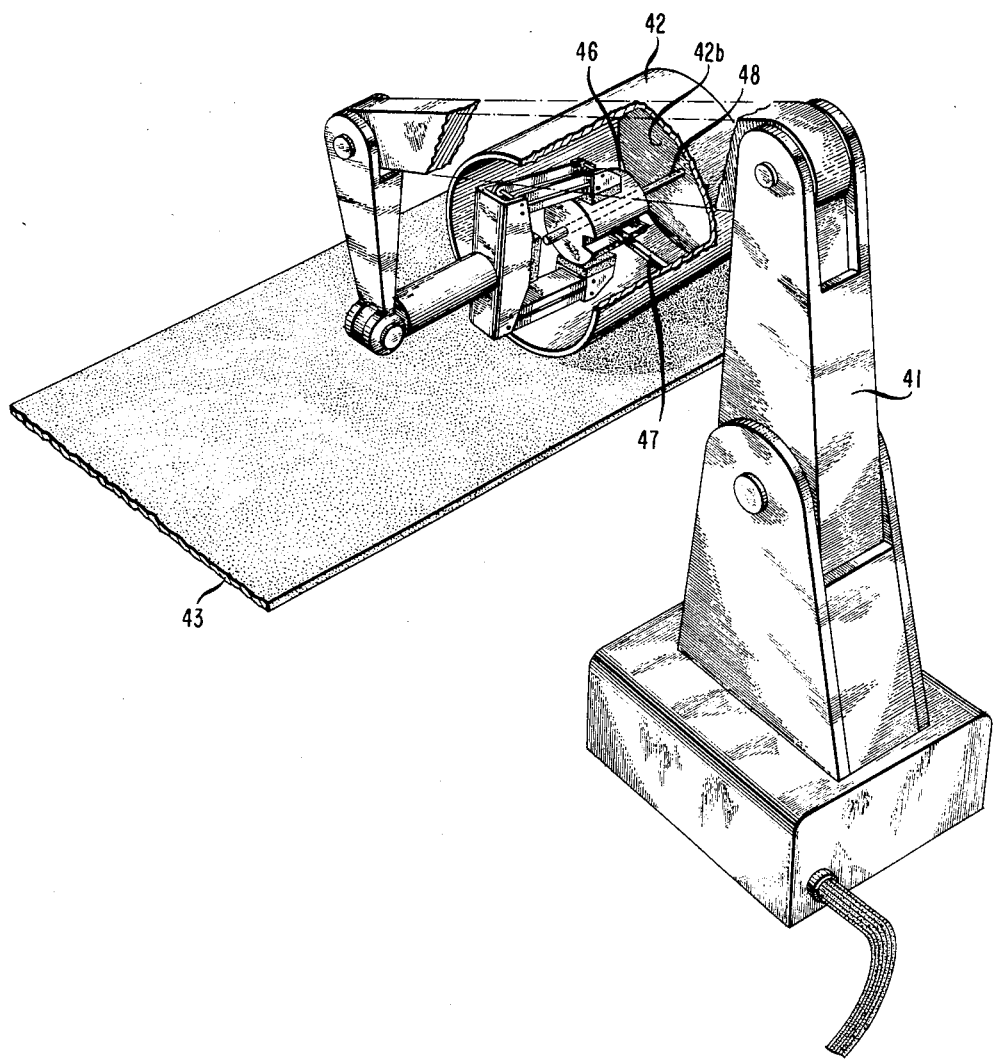

To illustrate these concepts further in the context of a manufacturing environment, consider a simple example from an assembly problem, schematically shown in FIG. 8. A robot 41 is depicted as being engaged in removing parts from the inside of hollow cylindrical objects 42 randomly scattered on a conveyor belt 43. The cylinders are closed at one end 42b and open at the other end 42a. FIG. 9 shows the robot arm inside a cylinder 42. A thin rod 48, parallel to the cylindrical axis but shorter than its length, is attached to the center of the cylinder base 42b. A quasi-cylindrical part 46 is free to slide along and rotate about the thin rod 48. An end view of the part 46 is shown in FIG. 10. To remove part 46 from the thin rod 48 the notch 50 must be aligned with pin 47 which protrudes from the inside wall of cylinder 42. A camera 44 sees the optical projection of the cylinder on the conveyor belt. Assuming that the robot has a computer memory with information stored as to the exact geometry of the objects (except, of course, for the position and orientation of part 46 along rod 48), the robot can, with the information provided by the camera 44, direct its hand into the cylinder along its axis toward the part to be extracted. The second camera 45 simply identifies the open end of the cylinders. However, since part 46 is free to rotate and slide, the robot cannot extract the part unless its hand can sense its range and orientation.

Figure 11:
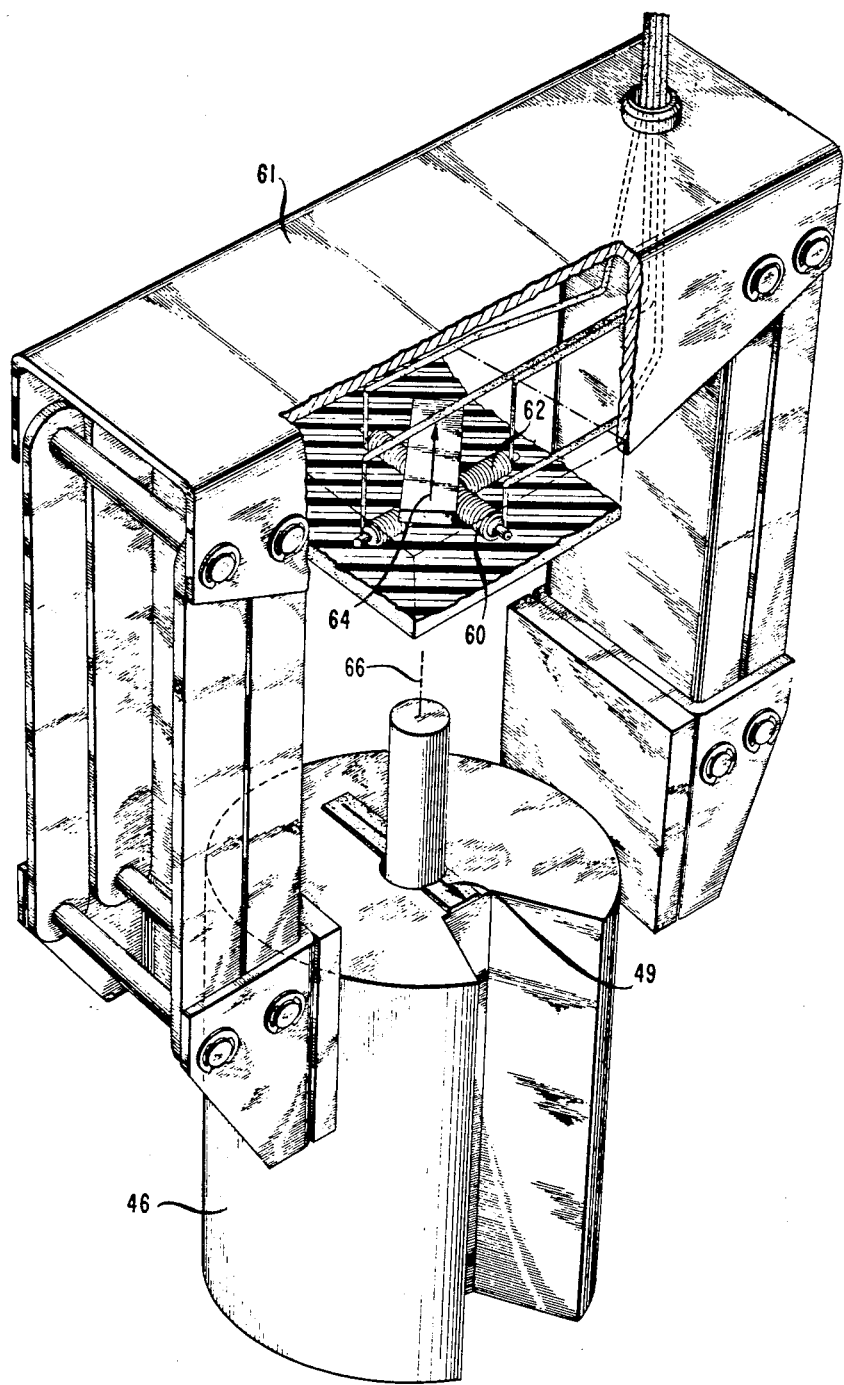
FIG. 11 shows a pair of mutually perpendicular RMM wires embedded in the palm of the robot hand which is approaching the object of FIG. 10. A reset magnet is located in the plane of the wires (or closely parallel to it) and at 45° to them.

In accordance with our invention, one solution to this problem is to provide part 46 with a magnetic marker 49 which can be sensed by RMM modules in the robot hand as described earlier. The marker could be natural (i.e., the object is magnetized) or applied (i.e., a magnetic strip) as an aid in assembly. For example, consider a simplified case for which the magnetic marker is a simple magnetic dipole 49 applied on part 46 through its center and pointing to the notch, as shown in FIG. 10. In this case a suitable magnetic read-head is shown in FIG. 11 where a pair of mutually perpendicular RMM wires 60 and 62 are embedded in the palm portion 61 of the robot hand. A small magnet 64 is located in the plane of the wires (or closely parallel to it), and its magnetization direction is oriented at 45° to them. The magnet 64 may be a permanent magnet, but, as discussed previously, an electromagnet would significantly enhance the reading capability of this unit; for simplicity we describe here the permanent magnet case. As the robot hand moves along the axis 66 toward the part 46, one of the RMM wires, say 60, switches at a distance D (from the dipole 49) which depends on the orientation of the dipole and on the strength of magnet 64. Subsequently, the switching of RMM wire 62 occurs at a distance d<D. Having measured the distance D-d, the robot in conjunction with a suitable computer and controller (not shown) can deduce its position and orientation with respect to part 46 in the following way.

Each RMM wire is sensitive only to the dipole component parallel to it. Thus, for a perfect dipole $d = k(\sin\theta)^{\frac{1}{3}}$ and $D = k(\cos\theta)^{\frac{1}{3}}$, where k is a constant that depends on the strength of the dipole and the reset field of magnet 64. Since k is known (for a given marker and reset field), and since D-d is measured, the robot can deduce D, d and $\theta$.

In practice, the problem is slightly more complex. First, the marker is not a perfect dipole. Second, a permanent reset magnet allows detection of $\theta$ through only a 45° range (i.e., 45° on either side of dipole 49). The latter problem is solved by using a reset electromagnet and switching polarity alternately. As to the first problem, the precise dependence of the switching field from the marker distance can be determined experimentally, as we have shown.

The above illustration has helped us to point out several aspects of magnetic sensing for robotics: (1) using machine vision systems and other available sensors, robots cannot locate recessed parts having some degree of freedom; (2) optical, capacitive and acoustic proximity sensors, and tactile sensors, all being surface dependent, cannot be utilized whenever the conditions of the surface are not known at the time of manipulation (e.g., because of recent exposure to paint, dirt, oil, etc.); (3) magnetic markers can be embedded and generally act independently of the surface conditions; (4) magnetic markers can be applied simply, cheaply and reliably, and many technologies for magnetic writing have been developed; (5) magnetic markers have the added advantage of being inherently oriented; and (6) a magnetic read-head can be embedded into robot hands and thus operate without interfering with other surface-dependent sensors which might have been placed on the same hand.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

It is clear that both the magnetic read-head and the magnetic markers can be designed to meet more general or more special applications, including perhaps read-write operations from robot to robot. Apart from these more sophisticated applications, we have demonstrated a new robotic magnetic proximity sensor based on reentrant-loop effects which has several advantages: (a) it is independent of rate of approach, (b) it is reliable in hostile environments, and (c) it yields an output easily processed by digital electronics.

What is claimed is:
1. A robot comprising
a robot hand having at least two moveable fingers for gripping a magnetized object,
a reentrant-loop magnetic first sensor incorporated in one of said fingers and having a first magnetization direction so as to sense said object when it lies outside the region between said fingers, and a reentrant-loop magnetic second sensor incorporated in another of said fingers and having a second magnetization direction different from said first direction so as to sense said object when it lies within said region.

2. The robot of claim 1 wherein said first and second magnetization directions are essentially perpendicular to one another.

3. The robot of claim 1 wherein said hand further includes
   a palm portion which connects said fingers to one another, and
   a reentrant-loop magnetic third sensor located in said palm portion.

4. The robot of claim 3 wherein said third sensor has a third magnetization direction which is essentially mutually perpendicular to said first and second directions.

5. The robot of claim 1 wherein said hand further includes
   a palm portion which connects said fingers to one another,
   a pair of third and fourth reentrant-loop magnetic sensors in said palm portion, said third and fourth sensors having co-planar magnetization directions oriented essentially perpendicular to one another, and
   a magnet having its direction of magnetization oriented at approximately 45° to each of said co-planar directions.

6. The robot of claim 5 wherein said magnet is an electromagnet.

7. The robot of claim 1, 2, 3, 4, 5, or 6 wherein each of said reentrant-loop magnetic sensors includes
   a wire comprising reentrant-loop magnetic material,
   a coil wrapped around said wire, and
   means for generating a magnetic field in said wire so that, when said object is in the proximity thereof, electrical pulses are generated in said coil.

8. The robot of claim 7 wherein said generating means comprises a magnet located proximate said wire.

9. The robot of claim 7 wherein said generating means comprises means for causing a current to flow in said coil.

10. The robot of claim 7 further including an electronic processor responsive to said electrical pulses for controlling the position of said hand and said fingers.

11. A manufacturing method, which includes a process of handling a magnetized object, said process comprising the steps of:
   causing a moveable hand of a robot, which hand includes fingers having at least two reentrant-loop magnetic sensors including a first sensor having a first magnetization direction so as to sense said object when it lies outside the region between said fingers and a second sensor having a second magnetization direction different from said first direction so as to sense said object when it lies within said region, to move to the vicinity of the object and thereby generate electrical signals from the sensors which correspond to the range or orientation of the object, and
   controlling the moveable hand in response to the signals so as to grip the object.

* * * * *